(12) United States Patent
Selle et al.

(10) Patent No.: US 6,932,134 B2
(45) Date of Patent: Aug. 23, 2005

(54) DEVICES AND METHODS FOR MANUFACTURING PACKAGING MATERIALS

(75) Inventors: Paul A. Selle, Appleton, WI (US); Mark C. Krueger, Green Bay, WI (US); Mitchell J. Hein, Green Bay, WI (US); Alan G. Box, Atlanta, GA (US)

(73) Assignee: Pactiv Corporation, Lake Forest, IL (US)

( * ) Notice: Subject to any disclaimer, the term of this patent is extended or adjusted under 35 U.S.C. 154(b) by 106 days.

(21) Appl. No.: 10/360,390

(22) Filed: Feb. 7, 2003

(65) Prior Publication Data

US 2004/0154728 A1 Aug. 12, 2004

(51) Int. Cl.$^7$ ............................................... B32B 31/00

(52) U.S. Cl. ........................ 156/497; 156/359; 156/510; 156/580; 156/145; 156/308.2; 53/79

(58) Field of Search ................................ 156/145–147, 156/308.2, 359, 497, 510, 580; 53/79

(56) References Cited

U.S. PATENT DOCUMENTS

| | | | |
|---|---|---|---|
| 2,877,609 A | | 3/1959 | Bodolay et al. |
| 3,389,534 A | | 6/1968 | Pendleton |
| 3,397,633 A | * | 8/1968 | Harris ........................ 156/359 |
| 3,488,244 A | * | 1/1970 | Lepisto ...................... 156/359 |
| 3,492,783 A | | 2/1970 | Dohmeier |
| 3,559,874 A | | 2/1971 | Titchenal |
| 3,575,757 A | | 4/1971 | Smith |
| 3,596,428 A | | 8/1971 | Young et al. |
| 3,660,189 A | | 5/1972 | Troy |
| 3,667,593 A | | 6/1972 | Pendleton |

(Continued)

FOREIGN PATENT DOCUMENTS

| | | |
|---|---|---|
| DE | 19913408 A1 | 10/2000 |
| EP | 0155109 A2 | 9/1985 |
| EP | 0256346 A2 | 2/1988 |
| EP | 0315882 A1 | 5/1989 |
| EP | 0240827 B1 | 11/1989 |
| EP | 0399965 A2 | 11/1990 |
| EP | 0401414 A1 | 12/1990 |
| EP | 0256346 B1 | 10/1991 |
| EP | 0345235 B1 | 10/1991 |
| EP | 0269145 B1 | 3/1992 |

(Continued)

OTHER PUBLICATIONS

Patent Abstracts of Japan, Publication No. 07016961, Jan. 20, 1995.
Patent Abstracts of Japan, Publication No. 07165267, Jun. 27, 1995.
Brochure: Packaging Stystems, Pactiv Advanced Packaging Solutions; Pactiv Corporation 1996, 6 color pages.

*Primary Examiner*—Jeff H. Aftergut
(74) *Attorney, Agent, or Firm*—Winston & Strawn LLP

(57) ABSTRACT

Devices and methods for inflating and sealing packaging pillows from a material web are shown for consistently producing high-quality packaging pillows. A web of material is advanced past an inflation nozzle, inflated with gas, and sealed closed by a sealing element. The temperature of the sealing element is monitored using a thermocouple connection and automatically adjusted using a closed-loop system. A sealing clamp parallel to the sealing element maintains two sheets of the web in contact through the sealing step. The inflation nozzle is provided with two inflation outlets: a first outlet inserting gas longitudinally into the web of material, and a second outlet inserting gas laterally into the material. Gas input is controlled with the use of relief valves to maintain pillow quality at all stages of production.

23 Claims, 9 Drawing Sheets

U.S. PATENT DOCUMENTS

| | | |
|---|---|---|
| 3,791,573 A | 2/1974 | Titchenal et al. |
| 3,817,803 A | 6/1974 | Horsky |
| 3,938,298 A | 2/1976 | Luhman et al. |
| 4,017,351 A | 4/1977 | Larson et al. |
| 4,021,283 A | 5/1977 | Weikert |
| 4,049,854 A | 9/1977 | Casey et al. |
| 4,076,872 A | 2/1978 | Lewicki et al. |
| 4,096,306 A | 6/1978 | Larson |
| 4,169,002 A | 9/1979 | Larson |
| 4,169,344 A | 10/1979 | Ganz et al. |
| 4,412,879 A | 11/1983 | Ottaviano |
| 4,415,398 A | 11/1983 | Ottaviano |
| 4,564,407 A | 1/1986 | Tsuruta |
| 4,619,635 A | 10/1986 | Ottaviano |
| 4,644,733 A | 2/1987 | Dolinar |
| 4,714,506 A | 12/1987 | Yamashiro et al. |
| 4,847,126 A | 7/1989 | Yamashiro et al. |
| 4,850,912 A | 7/1989 | Koyanagi |
| 4,894,264 A | 1/1990 | Akao et al. |
| 4,894,265 A | 1/1990 | Chang et al. |
| 5,070,675 A | 12/1991 | Chuan-Shiang |
| 5,203,761 A | 4/1993 | Reichental et al. |
| 5,216,868 A | 6/1993 | Cooper et al. |
| 5,257,492 A | 11/1993 | Watts |
| 5,312,132 A | 5/1994 | Pillet |
| 5,340,632 A | 8/1994 | Chappuis |
| 5,427,830 A | 6/1995 | Pharo |
| 5,454,642 A | 10/1995 | De Luca |
| 5,500,067 A | 3/1996 | Jenkner |
| 5,535,888 A | 7/1996 | De Luca |
| 5,552,003 A | 9/1996 | Hoover et al. |
| 5,581,983 A | 12/1996 | Murakami |
| 5,588,533 A | 12/1996 | Farison et al. |
| 5,620,096 A | 4/1997 | Pozzo |
| 5,660,662 A | 8/1997 | Testone |
| 5,673,541 A | 10/1997 | Arzuman et al. |
| 5,693,163 A | 12/1997 | Hoover et al. |
| 5,755,082 A | 5/1998 | Takahashi et al. |
| 5,755,328 A | 5/1998 | DeLuca |
| 5,824,392 A | 10/1998 | Gotoh et al. |
| 5,862,914 A | 1/1999 | Farison et al. |
| 5,873,215 A | 2/1999 | Aquarius et al. |
| 5,937,614 A | 8/1999 | Watkins et al. |
| 5,938,877 A | 8/1999 | Schram |
| 5,942,076 A | 8/1999 | Salerno et al. |
| RE36,501 E | 1/2000 | Hoover et al. |
| 6,015,047 A | 1/2000 | Greenland |
| RE36,759 E | 7/2000 | Hoover et al. |
| 6,116,000 A | 9/2000 | Perkins et al. |
| 6,170,227 B1 | 1/2001 | Kovacs et al. |
| 6,195,966 B1 | 3/2001 | Shomron et al. |
| 6,199,349 B1 | 3/2001 | Lerner |
| 6,209,286 B1 * | 4/2001 | Perkins et al. ............... 53/403 |
| 6,213,167 B1 | 4/2001 | Greenland |
| 6,253,806 B1 | 7/2001 | Sperry et al. |
| 6,253,919 B1 | 7/2001 | Sperry et al. |
| 6,341,473 B1 | 1/2002 | Kovacs et al. |
| 6,410,119 B1 | 6/2002 | De Luca et al. |
| 6,421,985 B1 | 7/2002 | Simmons, Jr. et al. |
| 6,423,166 B1 | 7/2002 | Simhaee |
| 6,453,644 B1 | 9/2002 | Baker |
| 6,460,313 B1 | 10/2002 | Cooper |
| 6,519,916 B1 | 2/2003 | Brown |
| 6,536,183 B1 | 3/2003 | Brown |
| 6,550,229 B2 | 4/2003 | Sperry et al. |
| 6,565,946 B2 | 5/2003 | Perkins et al. |
| 6,569,283 B1 | 5/2003 | Sperry et al. |
| 6,582,800 B2 | 6/2003 | Fuss et al. |
| D480,971 S | 10/2003 | DeLuca et al. |
| 2001/0000719 A1 | 5/2001 | Lerner et al. |
| 2001/0001921 A1 | 5/2001 | Sperry et al. |
| 2001/0013215 A1 | 8/2001 | Fuss et al. |
| 2001/0049921 A1 | 12/2001 | Sperry et al. |
| 2002/0092279 A1 | 7/2002 | Sperry et al. |
| 2002/0108351 A1 | 8/2002 | Sperry et al. |
| 2002/0108352 A1 | 8/2002 | Sperry et al. |
| 2002/0108697 A1 | 8/2002 | Perkins et al. |
| 2002/0112808 A1 | 8/2002 | Perkins et al. |
| 2002/0129583 A1 | 9/2002 | Simmons, Jr. et al. |
| 2002/0150730 A1 | 10/2002 | DeLuca et al. |
| 2002/0162301 A1 | 11/2002 | Davey |
| 2002/0189752 A1 | 12/2002 | Wetsch |
| 2003/0041566 A1 | 3/2003 | Hilbert, Sr. et al. |
| 2003/0079439 A1 | 5/2003 | Brown |
| 2003/0089082 A1 | 5/2003 | Fuss et al. |
| 2003/0118778 A1 | 6/2003 | Perkins et al. |

FOREIGN PATENT DOCUMENTS

| | | |
|---|---|---|
| EP | 0512187 B1 | 11/1992 |
| EP | 0329496 B1 | 1/1993 |
| EP | 0523382 A2 | 1/1993 |
| EP | 0513235 B1 | 10/1993 |
| EP | 0523382 B1 | 9/1996 |
| EP | 0787574 A2 | 8/1997 |
| EP | 0796802 A2 | 9/1997 |
| EP | 0816228 A2 | 1/1998 |
| EP | 0836926 A2 | 4/1998 |
| EP | 0816228 A3 | 5/1998 |
| EP | 0805769 B1 | 8/1998 |
| EP | 0689929 B1 | 9/1998 |
| EP | 0718195 B1 | 2/1999 |
| EP | 941933 A1 * | 9/1999 |
| EP | 0810958 B1 | 12/1999 |
| EP | 0978455 A2 | 2/2000 |
| EP | 1013573 A1 | 6/2000 |
| EP | 0978455 A3 | 7/2000 |
| EP | 1022124 A1 | 7/2000 |
| EP | 1022234 A1 | 7/2000 |
| EP | 0701954 B1 | 10/2000 |
| EP | 1044793 A1 | 10/2000 |
| EP | 0935521 B1 | 12/2000 |
| EP | 1138596 A1 | 10/2001 |
| EP | 1161932 A2 | 12/2001 |
| NL | 1011096 | 1/1999 |
| WO | WO 89/06557 A1 | 7/1989 |
| WO | WO 94/07678 | 4/1994 |
| WO | WO 96/22926 A1 | 8/1996 |
| WO | WO 96/26137 | 8/1996 |
| WO | WO 97/20756 A1 | 6/1997 |
| WO | WO 98/23502 A1 | 6/1998 |
| WO | WO 98/40276 A1 | 9/1998 |
| WO | WO 99/02409 A1 | 1/1999 |
| WO | WO 99/46103 A1 | 9/1999 |
| WO | WO 99/46182 A2 | 9/1999 |
| WO | WO 00/27619 A1 | 5/2000 |
| WO | WO 00/43198 | 7/2000 |
| WO | WO 00/53501 A1 | 9/2000 |
| WO | WO 01/21391 A1 | 3/2001 |
| WO | WO 01/53153 A1 | 7/2001 |
| WO | WO 01/85434 A2 | 11/2001 |
| WO | WO 02/14156 A1 | 2/2002 |
| WO | WO 02/26589 A1 | 4/2002 |
| WO | WO 02/64359 A2 | 8/2002 |

\* cited by examiner

DEVICES AND METHODS FOR MANUFACTURING PACKAGING MATERIALS

FIELD OF THE INVENTION

The present invention is directed to packaging materials and more particularly is directed to devices and methods for manufacturing pillows to be used as packaging material.

BACKGROUND OF THE INVENTION

Many techniques have been used to pack items for shipping and absorb impacts during shipment to protect shipped items. Popular shipping protection methods include the use of foam "peanuts," molded foam components, formed paper, and molded pulp packaging components.

A technique that has gained recent popularity involves inflating pillows from a film material. This style of packaging allows low-volume, uninflated materials to be shipped to packers, who then inflate the raw material into a shock-absorbing packing material that easily fits around items to be packaged within a container. Customized pillow inflating machines may be used at client sites to provide on-site pillow manufacturing.

Several concerns have arisen regarding pillows as a packaging material. It is important for pillow manufacturing machines to be compact, reliable, and easy to operate. Further, pillows should be quickly manufactured and adequately sealed to reduce the likelihood of leaking or bursting. In addition, pillow manufacturing devices should produce as little waste as possible in the form of underinflated or uninflated pillows. The present invention addresses these concerns.

SUMMARY OF THE INVENTION

According to one embodiment of the present invention, devices and methods are provided for inflating and sealing packaging pillows from an uninflated material web.

According to some embodiments of the present invention, an inflation nozzle having multiple inflation outlets provides inflation gas for a material web to inflate the material web into a strand of inflated pillows.

According to some embodiments of the present invention, inflated pillows are sealed by a sealing wire having a temperature controlled by a closed-loop temperature control system.

According to some embodiments of the present invention, inflated pillows are sealed adjacent a sealing clamp which holds two layers of the pillows together while a seal is created.

According to some embodiments of the present invention, inflation gas pressure is controlled during startup and shutdown of a sealing and inflating process to inhibit or eliminate pillow overinflation.

BRIEF DESCRIPTIONS OF THE DRAWINGS

Figure 3:
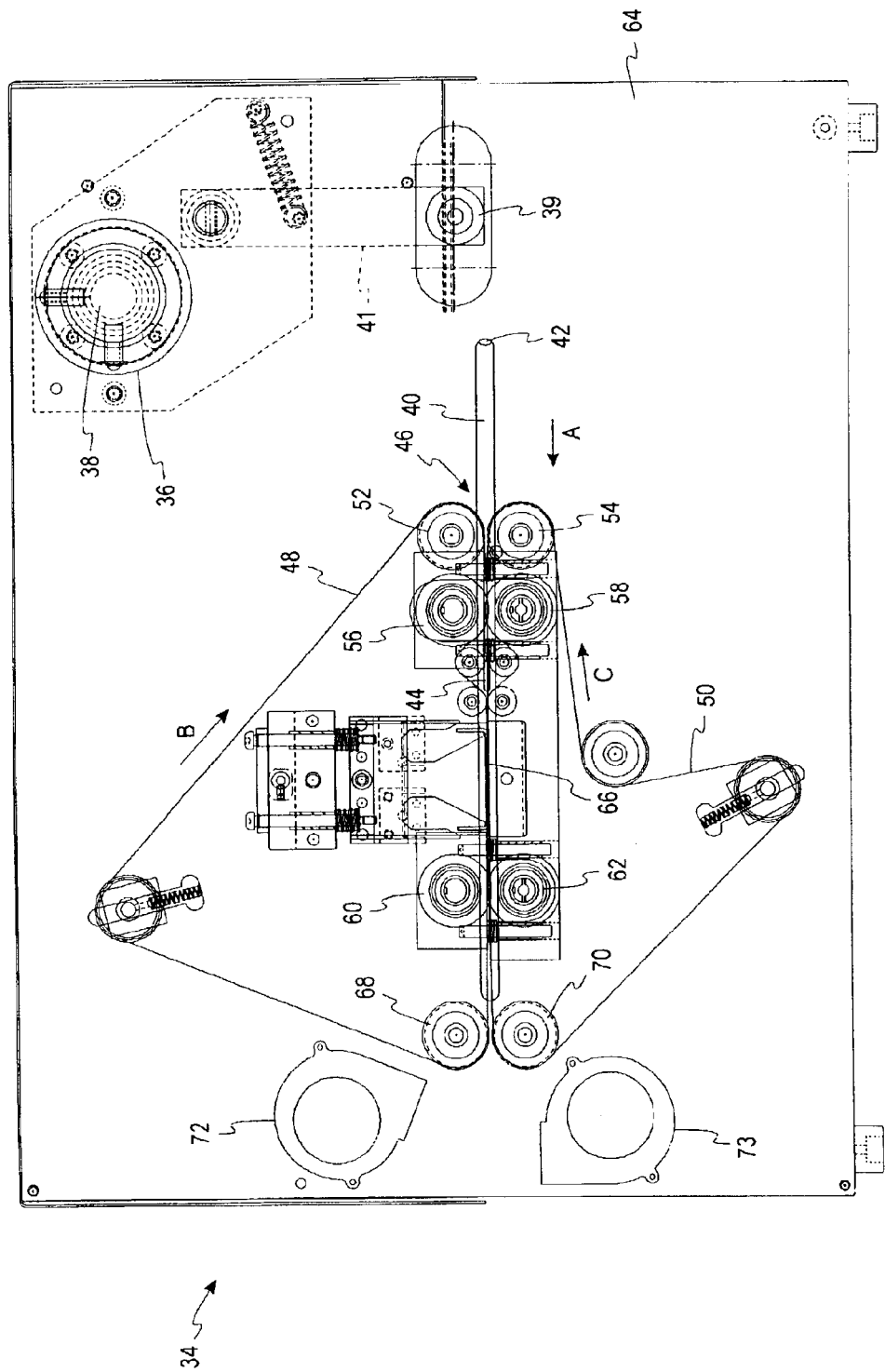
Figure 4:
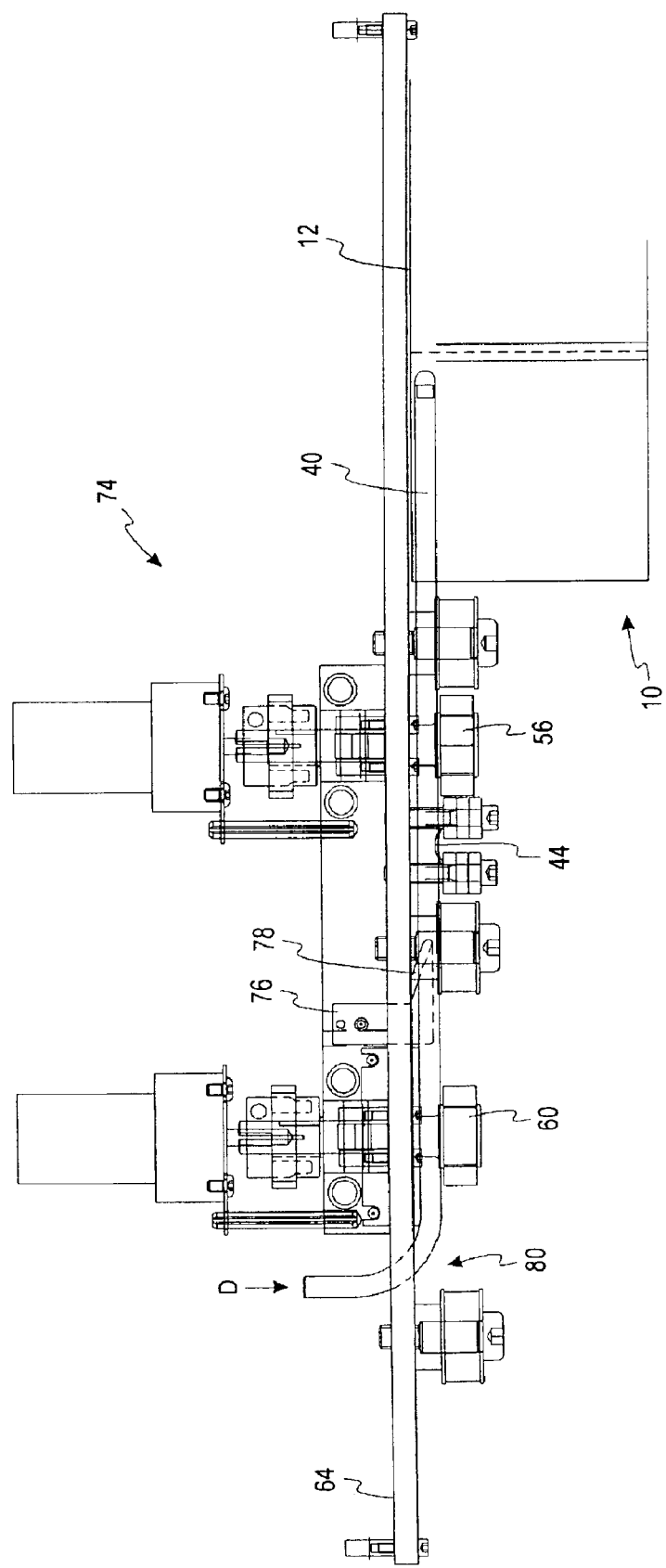
Figure 5:
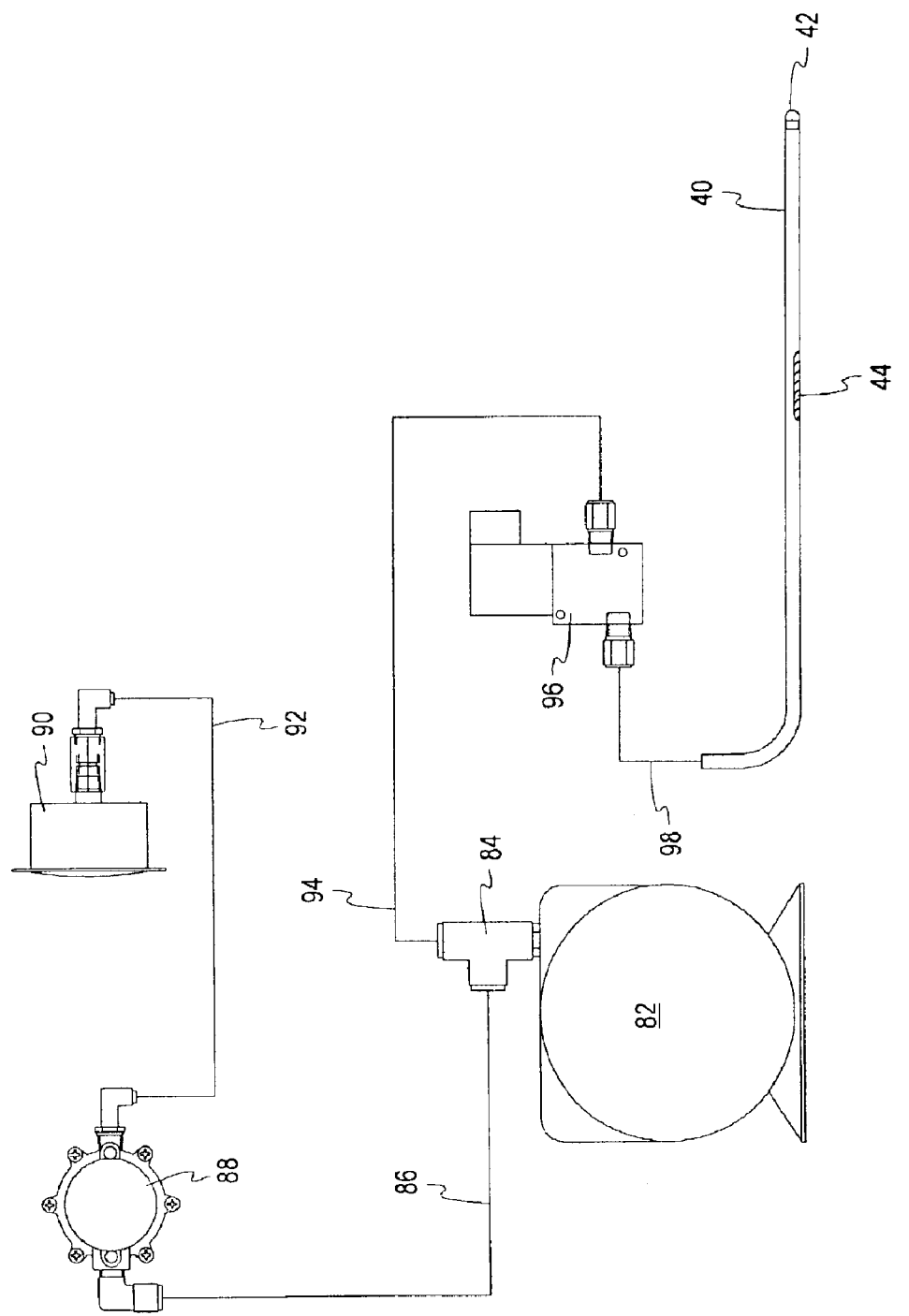
Figure 6:
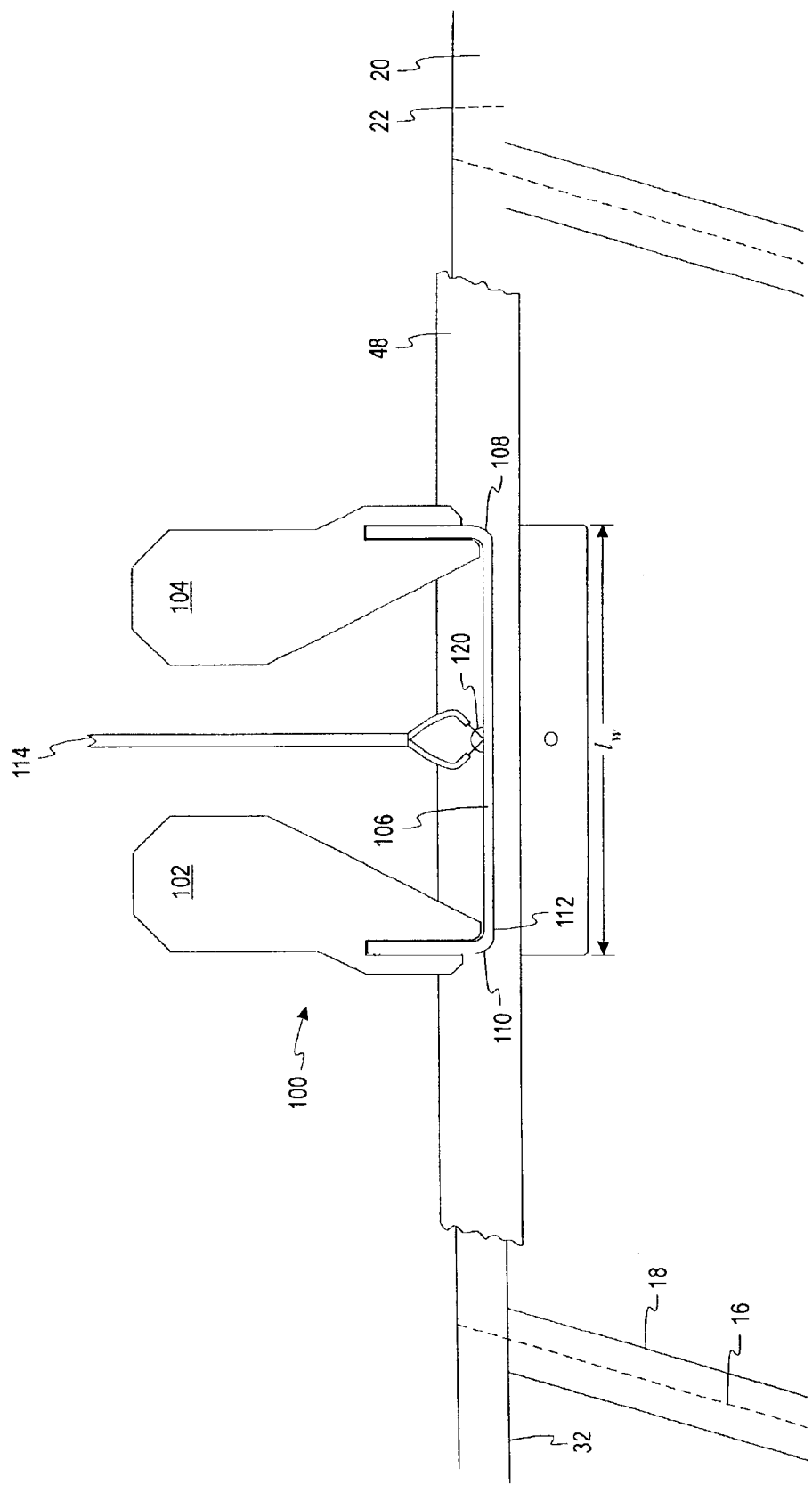
Figure 7:
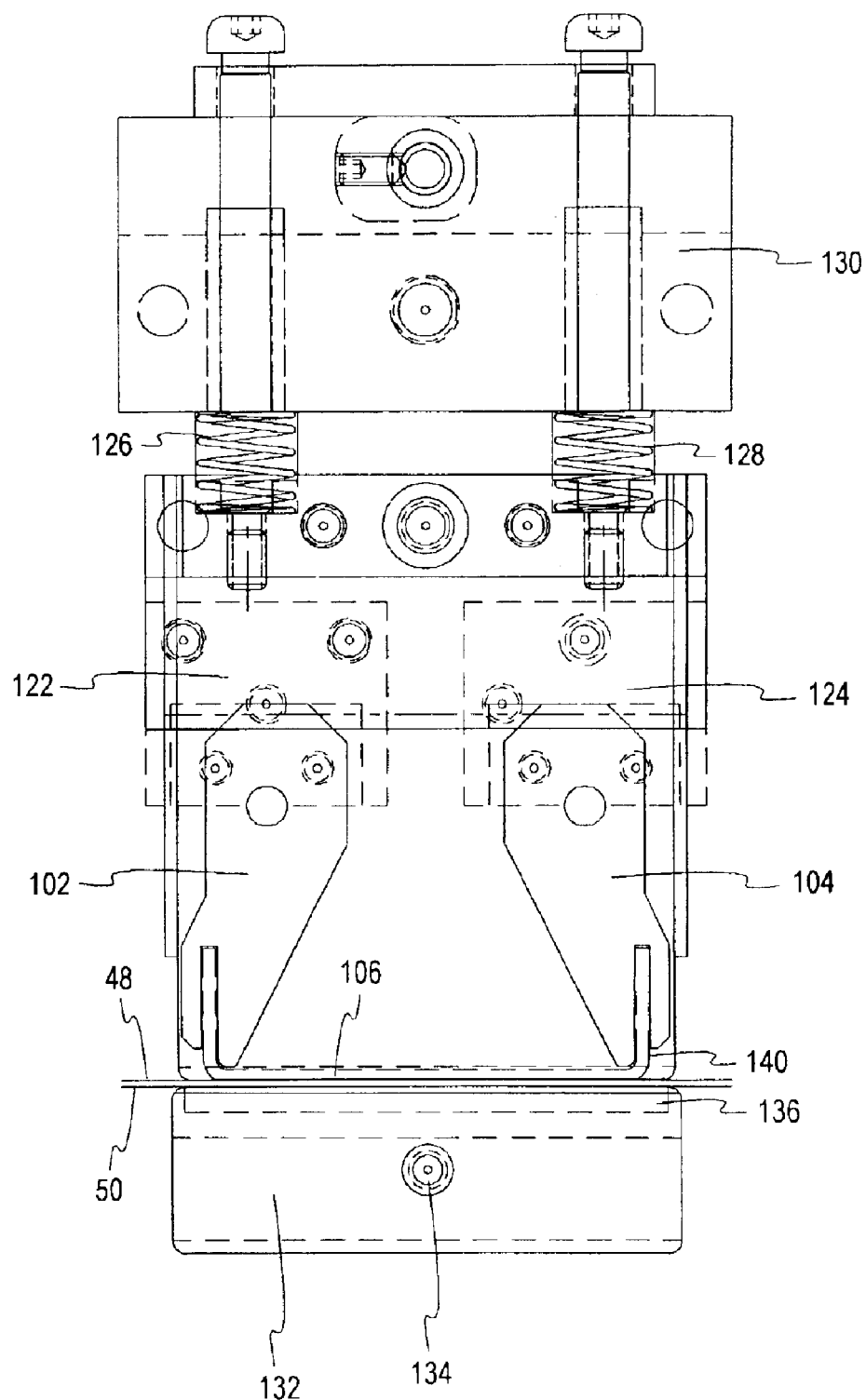
Figure 8:
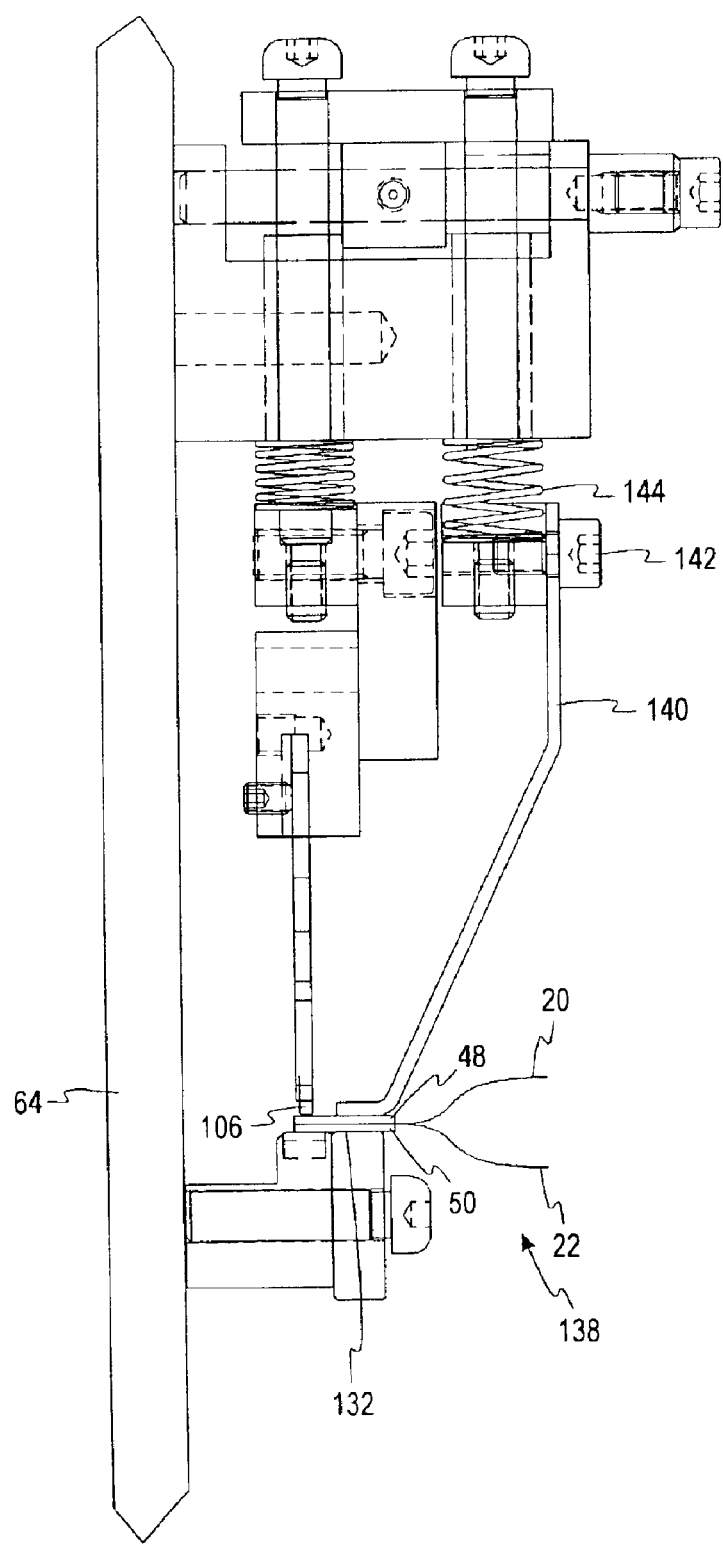
Figure 9:
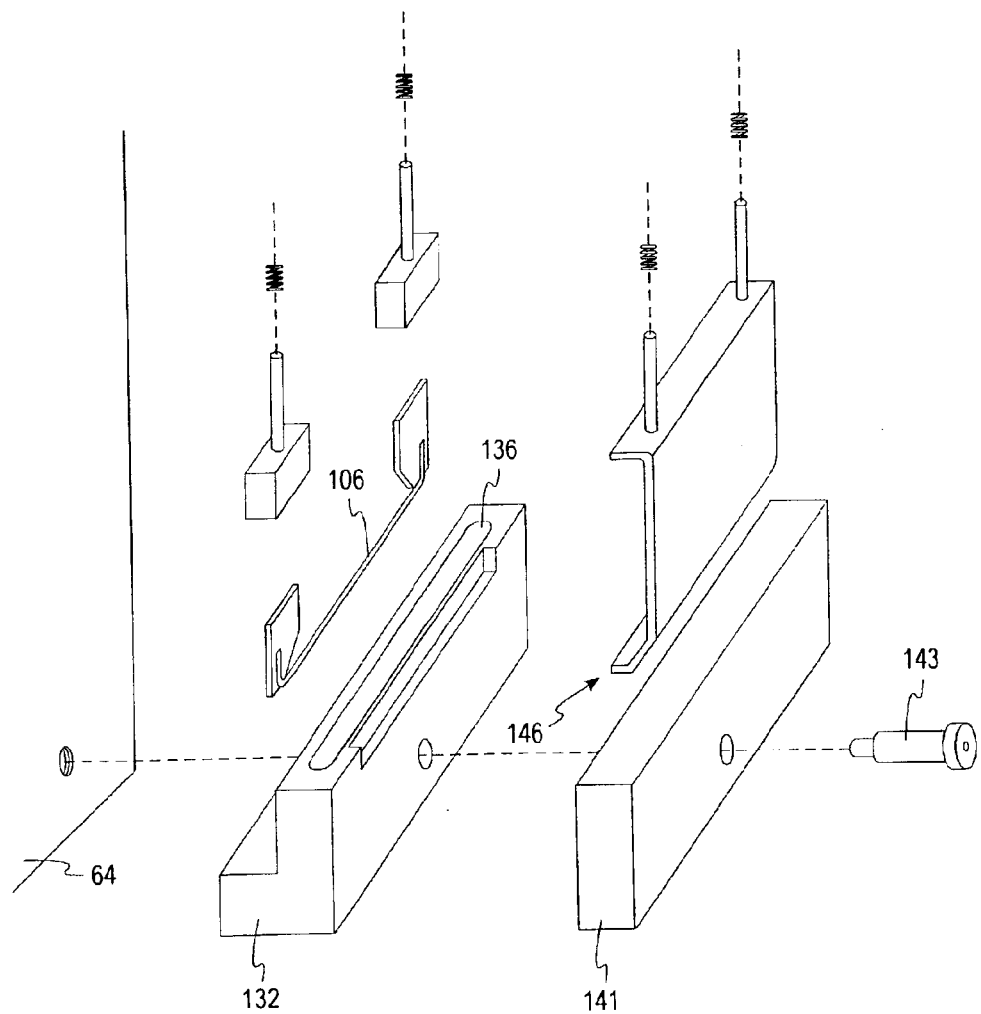
Figure 10:
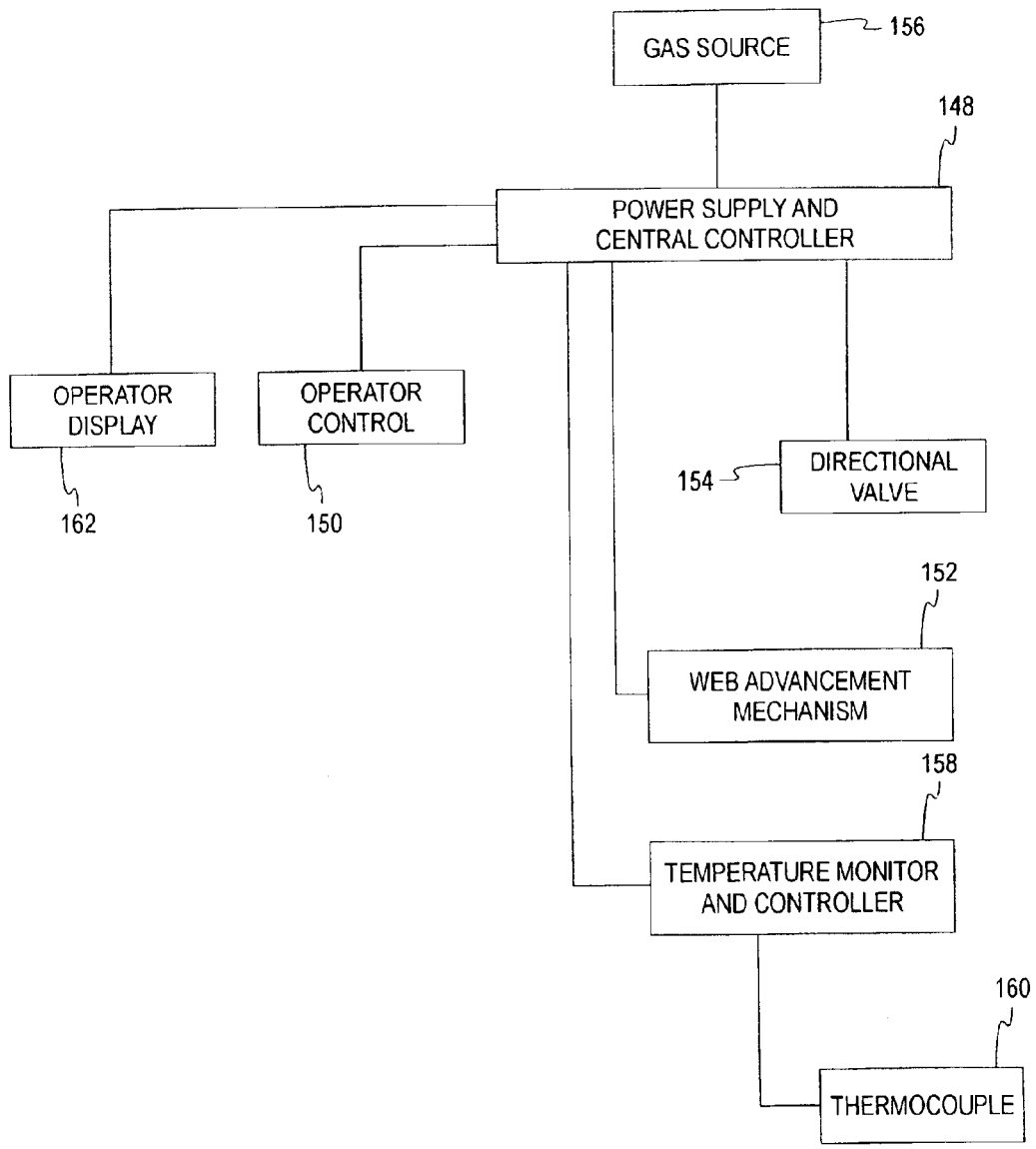

FIG. 3. is a side view of a pillow inflating and sealing machine according to one embodiment of the invention;

FIG. 4 is a top view of a pillow inflating and sealing mechanism according to one embodiment of the invention;

FIG. 5 is a schematic diagram of inflation gas flow according to one embodiment of the present invention;

FIG. 6 is a side view of a sealing device according to one embodiment of the present invention;

FIG. 7 is another side view of a sealing device according to one embodiment of the present invention;

FIG. 8 is an end view of a sealing and clamping mechanism according to one embodiment of the present invention;

FIG. 9 is an exploded view of a clamping and sealing mechanism according to one embodiment of the present invention; and FIG. 10 is a block diagram showing device components according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF ILLUSTRATED EMBODIMENTS

Figure 1:
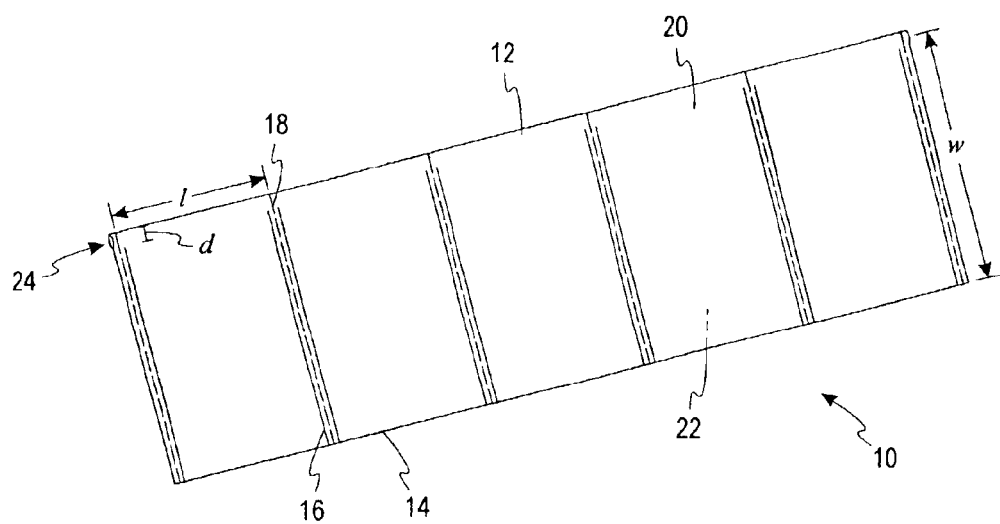
FIG. 1 is a top view of an uninflated material web according to one embodiment of the present invention.
Figure 2:
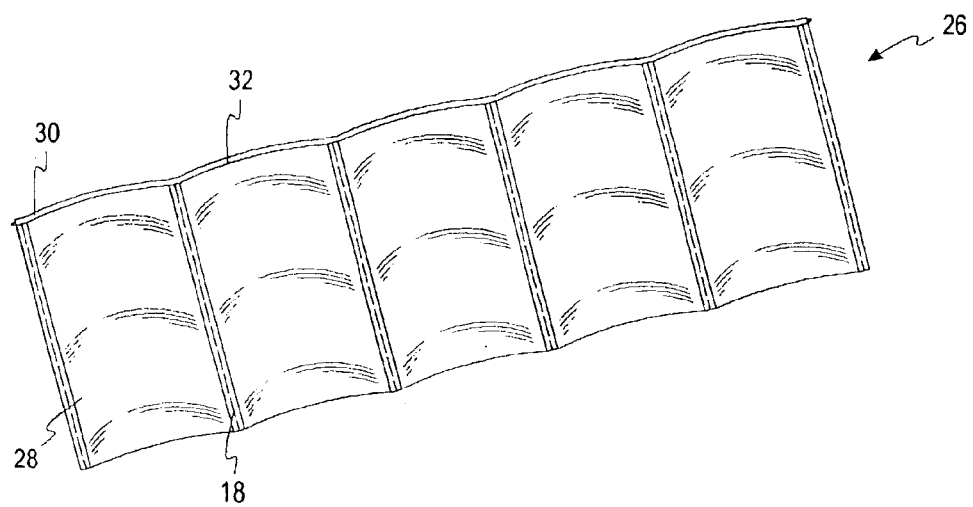
FIG. 2 is a top view of an inflated strand of pillows according to one embodiment of the invention.

The present invention is directed to systems and methods for converting uninflated material into inflated pillows that may be used as cushioning for packaging and shipping goods. FIG. 1 shows a web 10 of uninflated material to be inflated and sealed into a series of pillows attached at perforated edges, as shown in FIG. 2. The web 10 may be made of a variety of different materials, including materials such as polyethylenic resins such as LDPE, LLDPE, HDPE; metallocenes; EVAs; and blends thereof. The web 10 has a top edge 12 and a bottom edge 14, both of which are closed. The web 10 includes generally transverse seals 16 and generally transverse perforations 18. The transverse seals 16 join a top sheet 20 of the web 10 to a bottom sheet 22 of the web along the seals, while the transverse perforations 18 perforate the web through the top and bottom sheets 20 and 22. According to the embodiment shown in FIG. 1, the transverse seals 16 begin at the bottom edge 14 of the web 10 and extend to a distance d from the top edge 12. According to one embodiment of the present invention, the distance d is approximately 0.56 to 0.62 inches, though greater or smaller distances may be used according to some embodiments. Distances from about 0.25 inches to about 1.00 inch may be used in some embodiments of the present invention. Further, the web 10 has a width w, and a perforation-to-perforation length l, which may be altered depending on the particular type of pillow to be manufactured.

Because the transverse seals 16 do not reach the top edge 12 of the web, an opening 24 is left between the end of a transverse seal 16 and the top edge 12 of the web. This opening 24 is generally used to feed the web 10 into an inflation machine according to the present invention, which inflates and seals the web material 10 into the inflated strand of pillows 26 shown in FIG. 2. In FIG. 2, each inflated pillow 28 is separated from a neighboring inflated pillow by a transverse perforation 18. According to one embodiment of the present invention, small cutaway flaps 30 are left on the strand 26, as a remnant of the formation process, explained below. A longitudinal seal 32 is formed along the strand 26, so that each inflated pillow 28 is sealed closed, trapping the inflation gas within the pillow.

Turning now to FIG. 3, an inflation and sealing machine 34 for converting the web 10 of uninflated material into a series of inflated pillows 28 according to one embodiment of the present invention is shown. As shown in FIG. 3, the uninflated web 10 may be provided as a roll 36 of material provided on a roll axle 38. The material may be pulled through the machine in the direction shown by arrow "A" by a drive mechanism, and a guide roller 39 provided on a dancer arm 41 may be used to guide the web 10 away from the roll 36 and steadily toward the inflation mechanism. To prevent or inhibit bunching up of the material as it is unwound from the roll 36, the roll axle 38 may be provided with a brake to prevent or inhibit free unwinding of the roll 36 and to assure that the roll is unwound at a steady and controlled rate. According to one embodiment, a spring-loaded leather strap is used as a drag brake on the roll axle 38.

To begin manufacturing of inflated pillows from the web material according to this embodiment, the opening 24 in the web material (shown in FIG. 1) is inserted around an inflation nozzle 40. The inflation nozzle inserts pressurized gas into the uninflated web material, inflating the material into inflated pillows 28, as shown in FIG. 2. The inflation nozzle is provided with an end inflation hole 42 and a side inflation hole 44 (more clearly shown in FIG. 5). When the opening 24 in the web is fed around the end inflation hole 42, gas flowing through the end inflation hole 42 begins inflating the web material and further enlarges the area of the web around the opening 24 to enable easier feeding of the web through the machine 34 and to reduce machine noise caused by high-velocity gas passing between the layers of the web material 10.

In the embodiment of FIG. 3, when a new roll 36 of material is fed into the machine 34, the uninflated web is first inserted by hand around the inflation nozzle 40 and toward a web feed area 46 where the web is placed between first and second drive belts 48 and 50. The first drive belt 48 is driven in the direction shown by the arrow "B" of FIG. 3, and the second drive belt 50 is driven in the direction shown by arrow "C," such that the web will be driven in the direction of arrow "A" after being inserted into the web feed area 46. The web feed area 46 is located between a top insertion idler roller 52 and a bottom insertion idler roller 54, which respectively guide the first and second drive belts 48 and 50.

According to the embodiment of FIG. 3, the first and second drive belts 48 and 50 are driven by pairs of nip rollers. A top pre-seal nip roller 56 and a bottom pre-seal nip roller 58 work in combination with a top post-seal nip roller 60 and a bottom post-seal nip roller 62 to advance the drive belts 48 and 50, which in turn advance the web. According to one embodiment of the present invention, the drive belts 48 and 50 are coated with Teflon and the belts are substantially gripping and resilient to advance the web through the machine 34. According to some embodiments of the invention, the belts 48 and 50 may be made of Teflon-coated fiberglass or KEVLAR®. It is preferable to keep the belts narrow to facilitate more complete inflation of the pillows 28 as the web 10 is guided through the machine 34. According to one embodiment of the invention, only the bottom nip rollers are directly driven by motors located behind a mounting plate 64, with power transferred to the top nip rollers by gears located behind the mounting plate.

After being fed into the web feed area 46, the web is advanced to the side inflation hole 44 of the inflation nozzle 40, and inflation gas is inserted into the web to form inflated pillows 28. The belts 48 and 50 continuously advance the web with inflated pillows past a heat sealing element 66, which forms a continuous longitudinal seal 32 along the web by sealing the top and bottom sheets 20 and 22 of the web together. This sealing step is accomplished by heating the top and bottom sheets 20 and 22 with the heat sealing element 66 through the first drive belt to melt them together. The inflated and sealed pillows are advanced between the top and bottom post-seal nip rollers 60 and 62 and exit the belts at top and bottom post-seal idler rollers 68 and 70. The longitudinal seal 32 is cooled by a top cooling fan 72 and a bottom cooling fan 73 as the seal exits the belts. Alternatively or additionally, the belts and/or rollers may be directly cooled downstream of sealing formation.

Turning now to FIG. 4, a top view of the inflation and sealing mechanism 74 of the embodiment shown in FIG. 3 is illustrated, showing a web 10 of material that has been loaded onto the inflation nozzle 40. Because the top edge 12 of the web is continuous and closed, the inflation nozzle 40 must be removed from the web as the web is advanced. In the embodiment shown in FIG. 4, this is accomplished using a removable blade member 76 having an angled cutting edge 78 protruding from the inflation nozzle 40. The cutting edge 78 may be coated with titanium nitride to increase the cutting ability and wear resistance of the cutting edge 78. The inflation nozzle 40 is provided with a bend 80 to protrude through a hole in the mounting plate 64 to accept gas from a gas source producing gas flowing in the direction shown by arrow "D."

Inflation and sealing machines according to the present invention incorporate several features that help to assure that reliable and intact pillows are consistently inflated and sealed in an efficient and economic manner. Turning now to FIG. 5, a schematic of the provisioning and direction of pressurized gas according to one embodiment of the present invention is shown. A gas source 82 is provided within or near a device to provide gas for inflation of the pillows 28. According to one embodiment of the present invention, the inflation gas is ambient air, and the gas source 82 is an air pump. Alternatively, the inflation gas may be any gas suitable for inflation and the gas source 82 may be a compressed gas canister, air accumulator, or other compressed gas source.

Gas from the gas source 82 is input into a first coupler 84. A first gas line 86 exits the coupler and is coupled to a pressure regulator 88, and then to a pressure gauge 90. According to one embodiment, the pressure regulator 88 is a relieving regulator that emits gas from the system. According to one embodiment, the first gas line 86 is a ⅜ inch tube, which narrows down to a ⅛ inch tube in a second portion 92 before being input into the pressure gauge 90.

A second gas line 94 conveys gas from the first coupler 84 to a directional valve 96. According to one embodiment, the directional valve 96 is a solenoid-activated directional valve. A second portion 98 of the second gas line 94 conveys gas into the inflation nozzle 40, where it exits through the end inflation hole 42 and the side inflation hole 44 and is used to inflate packaging pillows. With this gas flow, the pressure gauge 90 measures the pressure in both gas lines, including the pressure in the pressure regulator 88 and the inflation nozzle 40. The pressure throughout the gas schematic shown in FIG. 5 is substantially similar throughout the system, and may be considered a system pressure.

The gas flow shown in FIG. 5 allows for the conservation of material in devices and methods of the present invention, because the directional valve 96 allows for the pulsing of gas out of a pillow manufacturing machine during starting and stopping of the machine. For example, in the machine 34 shown in FIG. 3, the first and second drive belts 48 and 50 travel slowly during startup of the machine as power is transferred to the driving nip rollers. As a result, the web 10 propagates very slowly through the machine 34 during startup. The gas source 82, however, is prepared to deliver a full load of gas to the slowly propagating web. If this full load of gas is delivered to the web, overinflation results, which may in turn result in weakened seals—because the overinflated pillow pulls away from the heat sealing element 66—or bursting pillows within the machine. To compensate, the directional valve 96 releases inflation gas during startup of the machine, thereby decreasing the pressure of gas provided into the second gas line 94, including the second portion 98, and into the inflation nozzle 40.

Similarly, when the machine is shut down, the web 10 is propagated more slowly as the driving nip rollers and belts 48 and 50 come to a stop. During the shutdown speed transition, the directional valve 96 is again pulsed as needed to assure that overinflation does not occur. According to one embodiment of the present invention, the duration and rate of pulses of the directional valve 96 is controlled by a programmable logic controller so that pulsing continues for a certain time during startup and shutdown. According to one embodiment of the present invention, the directional valve 96 is opened approximately 9 times for 0.5 to 0.50 seconds per opening during the first three seconds during startup and during the last three seconds during shutdown. Alternatively, a variable speed blower could be used to control inflation during startup and shutdown. According to one embodiment, with an inflation machine operating at zero speed, from 90% to 100% of inflation gas is relieved, with an inflation machine operating at half speed approximately half of the inflation gas is relieved, and with an inflation machine operating at full speed, no inflation gas is relieved and the inflation nozzle receives substantially all of the inflation gas from the gas source 82.

The gas flow path of FIG. 5 also allows for operator control of the amount of gas being input into the web 10 to inflate pillows 28. The relieving pressure regulator 88 bleeds off excess gas to maintain a set system pressure. A pressure gauge 90 may be provided along the gas flow system to allow an operator to monitor and control the proper inflation pressure. Depending on the speed with which the web 10 is propagated and inflated using a device according to the present invention, the relieving pressure regulator 88 may be adapted to release gas at comparatively higher or lower pressures. Factors that influence the desired gas pressure include the desired pillow size and the desired inflation per pillow. For example, according to one embodiment of the present invention, the web is propagated through the machine 34 of FIG. 3 at a speed of approximately 50 feet per minute. At this speed, a pressure within the inflation nozzle 40 of between approximately one and five pounds per square inch is appropriate to inflate the gas pillows using the web shown in FIG. 1. Though the optimum pressure is dependent on the size of inflation openings and the desired rate of ejection of gas through the inflation openings, devices and methods according to the present invention using pressures from approximately 0.5 pounds per square inch and approximately 5.0 pounds per square inch are appropriate for some embodiments. According to some embodiments of the present invention, a programmable logic controller may be used to control system pressure.

Devices and methods according to the present invention are capable of making reliable longitudinal seals in manufactured gas pillows. Turning now to FIG. 6, a heat sealing element 100 according to one embodiment of the present invention is shown. The heat sealing element 100 includes first and second mounting fins 102 and 104 holding a sealing wire 106 therebetween The sealing wire 106 contacts the first drive belt 48 and heats the first drive belt to a sufficient temperature in the vicinity of the sealing wire 106 to weld the top and bottom sheets 20 and 22 to each other, thereby forming a longitudinal seal 32. The sealing wire 106 may be heated by passing a current through the wire. In the embodiment shown in FIG. 6, the sealing wire 106 is provided with a first bent portion 108 where the sealing wire 106 first contacts the first drive belt 48 and a second bent portion 110 where the sealing wire 106 is removed from contact with the first drive belt 48. Other sealing wire mounting techniques may be used in alternative embodiments.

The sealing wire 106 contacts the first drive belt 48 along a contact surface 112. According to one embodiment of the present invention, the contact surface 112 has a length $l_w$ of approximately 2 inches, and the sealing wire 106 comprises an 80-20 Nickel—Chromium alloy and has a cross-sectional area of approximately 0.003 $in^2$. To minimize overheated hot spots along the length of the sealing wire 106, maximize the life of the first drive belt 48, and prevent or inhibit the need for frequent replacement of the drive belt 48, the areas of the first bent portion 108, second bent portion 110, and contact surface 112 of the sealing wire 106 where the sealing wire touches the belt 48 are manufactured, rounded, and provided with a smooth finish. According to one embodiment, the sealing wire 106 is straight within about 0.005 inch over a length of about two inches.

The sealing wire 106 is preferably maintained at a consistent sealing temperature so that heat is properly transferred through the belt 48 onto the web 10 to reliably weld the top sheet 20 to the bottom sheet 22. In one embodiment of the present invention, the web 10 is a polyethylene web, and the sealing wire 106 is kept at a temperature set point of approximately 420° F. The sealing temperature set point may be raised or lowered depending on such factors as the speed at which the machine 34 is operated, the material properties of the web 10, the ambient temperature conditions, the condition of the sealing wire 106, the condition and material properties of the belt 48, and the like. Temperatures of from about 300° F. to about 600° F. are preferred in some embodiments of the invention, though even wider temperature ranges may be called for in certain embodiments.

According to some embodiments of the present invention, a closed-loop temperature control is employed to maintain the sealing wire 106 at an optimal sealing temperature. A thermocouple 114 may be used to sense the temperature of the sealing wire 106. According to one embodiment of the present invention, with the sealing wire 106 being a nickel-chromium sealing wire, a nickel-bearing silver alloy connection 120 is provided between the thermocouple 114 and the sealing wire 106, with a small amount of brazing used to secure the connection 120 to the sealing wire 106. The thermocouple allows accurate measurement of the temperature of the sealing wire 106 when the thermocouple 114 is connected to a temperature control module. The closed loop feedback provided by the thermocouple 114 allows the temperature control module to maintain the sealing wire temperature within an exact range. This temperature control is possible even when changing factors would cause the temperature of the sealing wire 106 to drift. Such factors may include poor contact between the mounting fins 102 and 104 and the sealing wire 106 resulting in poor current transmission to the sealing wire 106, the replacement of the sealing wire 106 with a new sealing wire having a difference in resistance, the pressure of the sealing wire 106 against the belt, the blend of film used in the web 10, and the condition and thickness of the belt 48. According to some embodiments of the present invention, the temperature of the sealing wire 106 is maintained within about ±3° F. of a selected sealing temperature, though higher or lower tolerances are used according to some embodiments of the invention. In some embodiments of the present invention, sensors such as an infrared non-contact temperature sensor or a current detecting sensor may be used to gather temperature information regarding the sealing wire 106.

Turning now to FIG. 7, a side view of the heat sealing wire 106 and its surrounding structure is shown. The first and second mounting fins 102 and 104 are mounted to first and second mounting blocks 122 and 124. Downward pressure is maintained on the first and second mounting blocks 122 and 124 by first and second compression springs 126 and 128, which are provided between the first and second mounting blocks 122 and 124 and a top mounting block 130. The top mounting block 130 may be directly mounted to the mounting plate 64, as shown in FIG. 3. This construction allows the sealing wire 106 to maintain reliable contact with the first drive belt 48.

According to some embodiments of the present invention, the sealing wire 106 is unsupported along its length as it contacts the first drive belt 48. To avoid bending of the sealing wire 106 and to maintain contact between the sealing wire and the first drive belt 48—and thus maximize the transmission of thermal energy from the sealing wire 106 to the web 104—a sealing support platen 132 is provided beneath the second drive belt 50 in the heat sealing area. Thus, the first drive belt 48, the web 10, and the second drive belt 50 are interposed between the sealing wire 106 and the sealing support platen 132. According to one embodiment of the invention, the sealing support platen 132 is provided with a platen pivot 134 about which the platen is free to rotate. Thus, the sealing support platen 132 is self-aligning with the sealing wire 106, maintaining more complete contact between the first drive belt 48 and the sealing wire 106 along the contact surface 112 of the sealing wire. According to some embodiments, the sealing wire 106 may be supported along its length, for example by a thermocouple.

According to some embodiments of the present invention, to maintain a more complete contact between the first drive belt 48 and the sealing wire 106 along the contact surface 112, a top surface 136 of the sealing support platen 132 is resilient, with the body of the platen 132 being aluminum or another suitable material. Resilient material along the top of the sealing support platen 132 allows for even pressure across the sealing wire regardless of imperfections in the straightness of the sealing wire. A resilient surface may be provided with a multi-layer surface construction comprising a base layer of silicone high-temperature adhesive to provide adhesion between the resilient layers and the support platen 132, a second layer of silicone having a durometer of 30 as measured on a "Shore A" machine, and a top layer of resilient tape. According to one embodiments, the top resilient layer is DURIT® tape manufactured by Toss Manufacturing company.

Although the web 10 is held between two drive belts as well as between the sealing wire 106 and the sealing support platen 132 in the area of sealing, the inflated pillows result in the top sheet of the web 20 separating from the bottom sheet of the web 22, which in turn tends to draw the inflated pillows away from the sealing wire, in an outward direction from the mounting plate 64. This formation is more clearly illustrated in FIG. 8, which is an end view of a sealing area sealing an inflated pillow 138 according to one embodiment of the present invention. To maintain the top sheet of the web 20 in contact with the bottom sheet of the web 22 in the sealing area, a sealing clamp 140 is provided along the distance of the sealing wire 106. The sealing clamp is biased against the first drive belt 48 similarly to the sealing wire 106. The sealing clamp is mounted in a sealing clamp mount, which uses sealing clamp compression springs 144 to maintain a downward pressure on the sealing clamp 140, such that a clamp contact surface 146 maintains an even force keeping the belts 48 and 50, as well as the top and bottom sheets 20 and 22 of the inflated pillow 138, pressed against each other in the sealing area. In the embodiment of FIG. 8, both the sealing wire 106 and the sealing clamp 140 are biased against separate platens, with the sealing wire 106 located closer to the mounting plate 64 than the sealing clamp 140. Alternatively, one platen may be used to support both the sealing wire 106 and the sealing clamp 140. The relationship between the sealing wire 106 and the sealing clamp 140 is also shown in FIG. 9, which shows both the sealing wire 106 and the contact surface 146 of the sealing clamp 140 in relation to the sealing support platen and a clamp support 141. A pivot shoulder screw 143 may be used to connect the sealing support platen 132 and the clamp support 141 to the mounting plate 64, allowing supports to pivot and self-align with the sealing wire 106 and the sealing clamp 140.

Turning now to FIG. 10, a schematic is shown displaying connections among control and power components according to one embodiment of the present invention. A power supply and central controller 148 reacts to operator inputs from an operator control 150 to power and control components of an inflation and sealing device according to one embodiment of the present invention. While the power supply and central controller 148 is shown as a single component in FIG. 10, it is to be understood that these may be two separate but interconnected components.

A web advancement mechanism 152, including for example motors for driving driven nip rollers, is connected to the power supply and central controller 148 for power and to accept startup, advancement speed, and shutdown control signals. A directional valve 154 is connected to the power supply and central controller 148 for supplied power and gas release control signals for operation during startup and shutdown of an inflation and sealing device. A gas source 156 is connected to the power supply and central controller to accept power and further to accept startup and shutdown signals. A temperature monitor and controller 158 is connected to the power supply and central controller 148 to accept power and temperature control signals and to report on sealing wire temperature using signals generated by a thermocouple 160. An operator display 162 may be connected to the power supply and central controller 148 to provide operation information to an operator.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A device for inflating and sealing a material web, said device comprising:

a web advancement mechanism including a first belt having an inner surface and an outer surface and being driven by a first belt drive mechanism in a first belt drive direction, and a second belt having an inner surface and an outer surface and being driven by a second belt drive mechanism in a second belt drive direction, said outer surface of said second belt contacting said outer surface of said first belt at least at a belt junction, said first and second belts being driven in a material drive direction at said belt junction, wherein material web is accepted at said belt junction between said first belt and said second belt and driven in said material drive direction;

an inflation mechanism to insert a gas into the material web to create a series of inflated pillows;

a heat sealing member to seal the gas into the inflated pillows, said heat sealing member including a heat sealing element for sealing the inflated pillows with a longitudinal seal, said heat sealing element abutting said inner surface of said first belt at a heat sealing area spaced from said belt junction in said material drive direction, said second belt opposing said first belt at said heat sealing area and, a heat sealing support platen, said first belt and said second belt positioned between said heat sealing element and said heat sealing support platen, said heat sealing support platen having a platen pivot for aligning said heat sealing support platen with said heat sealing element.

2. The device of claim 1 further comprising one or more cooling fans for cooling the longitudinal seal following the formation of the longitudinal seal.

3. The device of claim 1, wherein said inflation mechanism includes an inflation nozzle for inserting the gas into the material web, and a gas source providing pressurized gas to said inflation nozzle.

4. The device of claim 3 wherein said gas source is an air pump.

5. The device of claim 1 wherein said first belt is coated with Teflon.

6. The device of claim 1, wherein said heat sealing member further includes a sealing clamp contacting said inner surface of said first belt parallel and laterally spaced from said heat sealing element, said sealing clamp providing a force pressing said first belt and said second belt together between said sealing clamp and said heat sealing support platen.

7. The device of claim 6, wherein the inflation mechanism includes an inflation nozzle to insert the gas into the material web, said inflation nozzle having a first opening in a direction opposite a web advance direction to insert the gas longitudinally into the material web, said inflation nozzle further having a second opening in a direction transverse to said web advance direction to insert the gas transversely into the material web;

a pressurized gas source emitting the gas;

a pressure relief member in fluid communication between said pressurized gas source and said inflation nozzle, said pressure relief member receiving the gas from said pressurized gas source, said pressure relief member having a pressure adjuster for controlling an amount of gas released through said pressure relief member; and, a fitting having a gas source opening and an inflation nozzle opening, said gas source opening being in fluid communication with said pressurized gas source, said inflation nozzle opening being in fluid communication with said inflation nozzle via an inflation gas path, said inflation gas path having a directional valve to modify the flow of inflation gas during a startup and a shutdown of said device.

8. The device of claim 1, wherein the heat sealing member further includes a thermocouple attached thereto to sense a sealing temperature of the heat sealing member and generate a temperature signal, and a temperature controller to accept said temperature signal and control the temperature of said heat sealing member by controlling a current supplied to said heat sealing member.

9. A device for inflating and sealing a material web, said device comprising:

a web advancement mechanism to advance a material web in a web advance direction;

an inflation mechanism to insert a gas into the material web to create a series of inflated pillows, said inflation mechanism including an inflation nozzle for inserting the gas into the material web, said inflation nozzle having a first opening in a direction opposite the web advance direction to insert the gas longitudinally into the material web, said inflation nozzle further having a second opening in a direction transverse to the web advance direction to insert the gas transversely into the material web; and, a heat sealing member to seal the gas in the inflated pillows.

10. The device of claim 9 further comprising a gas source supplying the gas to said inflation nozzle.

11. The device of claim 10 wherein said gas source is an air pump.

12. The device of claim 10 wherein said gas source is a compressed gas canister.

13. The device of claim 10 wherein said gas source is an air accumulator.

14. The device of claim 9, wherein said inflation mechanism includes a pressurized gas source emitting the gas; and a pressure relief member in fluid communication between said pressurized gas source and said inflation nozzle, said pressure relief member receiving the gas from said pressurized gas source, said pressure relief member having a pressure adjuster for controlling an amount of gas released through said pressure relief member.

15. The device of claim 14 further comprising a pressure gauge measuring a pressure at said pressure relief member.

16. The device of claim 14 wherein said pressure relief member is a relieving pressure regulator.

17. The device of claim 14, further comprising:

a fitting having a gas source opening, an inflation nozzle opening, and a pressure relief opening, said fitting accepting the gas from said pressurized gas source through said gas source opening, said inflation nozzle receiving the gas from said fitting and inserting the gas into the material web at an inflation gas flow rate to inflate the material web, wherein said pressure relief member receives the gas from said pressure relief opening.

18. The device of claim 9, wherein the heat sealing member further includes a thermocouple attached thereto to sense a sealing temperature of the heat sealing member and generate a temperature signal, and a temperature controller to accept said temperature signal and control the temperature of said heat sealing member by controlling a current supplied to said heat sealing member.

19. A device for inflating and sealing a material web, said device comprising:

a web advancement mechanism including first and second belts to accept a material web at a belt junction between said first and second belts and advance the material web in a web advance direction;

an inflation mechanism to insert a gas into the material web to create a series of inflated pillows;

a heat sealing member to seal the gas into the inflated pillows, said heat sealing member including a heat sealing element contacting at least one of the first and second belts at a heat sealing area spaced from said belt junction, and a thermocouple attached to the heat sealing element to sense a sealing temperature of the heat sealing element and generate a temperature signal; and a temperature controller to accept said temperature signal and controlling the temperature of said heat sealing element by controlling a current supplied to said heat sealing element.

20. The device of claim 19 wherein said temperature controller is adapted to control said temperature of said heat sealing element within ±3° F. of a set temperature.

21. A device for inflating and sealing a material web, said device comprising:

a web advancement mechanism to advance a material web in a web advance direction;

an inflation mechanism to insert a gas into the material web to create a series of inflated pillows, said inflation mechanism including an inflation nozzle for inserting the gas into the material web, a pressurized gas source emitting the gas, and a fitting having a gas source opening and an inflation nozzle opening, said inflation nozzle opening being attached to said inflation nozzle via an inflation gas path, said inflation gas path having a directional valve to modify the flow of inflation gas during a startup and a shutdown of said device;

a heat sealing member to seal the gas in the inflated pillows, said heat sealing member having a thermocouple attached thereto to sense a sealing temperature of the heat sealing member and generate a temperature signal; and a temperature controller to accept said temperature signal and control said temperature of said heat sealing member by controlling a current supplied to said heat sealing member.

22. The device of claim 21 wherein said directional valve is a solenoid-activated activated directional valve to modify said flow of inflation gas under direction from a controller.

23. The device of claim 21 wherein said pressurized gas source is an air pump.

* * * * *

UNITED STATES PATENT AND TRADEMARK OFFICE
CERTIFICATE OF CORRECTION

| | |
|---|---|
| PATENT NO. | : 6,932,134 B2 |
| APPLICATION NO. | : 10/360390 |
| DATED | : August 23, 2005 |
| INVENTOR(S) | : Selle et al. |

It is certified that error appears in the above-identified patent and that said Letters Patent is hereby corrected as shown below:

Column 12,
Line 25, after "is a solenoid activated", delete "activated".

Signed and Sealed this

First Day of August, 2006

JON W. DUDAS
*Director of the United States Patent and Trademark Office*